Sept. 14, 1948.  C. E. BRIDWELL  2,449,106

VALVE CAGE

Filed Sept. 2, 1944

INVENTOR.
CHALON E. BRIDWELL
BY
HIS ATTORNEY

Patented Sept. 14, 1948

2,449,106

UNITED STATES PATENT OFFICE 2,449,106

VALVE CAGE

Chalon E. Bridwell, Detroit, Mich.

Application September 2, 1944, Serial No. 552,533

2 Claims. (Cl. 277—42)

My invention relates to a new and useful improvement in a pump structure and particularly in a structure adapted for pumping oil from oil wells. The invention particularly relates to the valve construction of the pump structure.

In pumps of this type, a valve member which is loosely positioned in a valve cage is adapted for movement into engagement with a valve seat. Whether the valve member is a ball or a drop valve, such as a disc or the like, common difficulties are encountered.

One of these difficulties is the pounding of the valve member against the valve seat so that the valve member itself is defaced and sometimes broken and the valve seat becomes defaced and sometimes broken. This pounding is the result of the liquid weight pushed above the valve member and bearing downwardly on it. In very deep wells where the column of liquid above is many hundreds of feet in length, the weight is very considerable and sufficient to exert a blow to crack a steel ball or to distort and misshape the ball or valve member should the member be made of comparatively soft material.

Another difficulty is the defacing of the valve or the valve seat through the sand cutting action. Should sand or other foreign material lodge between the valve seat face and the valve member so that the valve member is held in slightly spaced relation to the valve seat, the sand-bearing fluid passing between these spaced apart members will very rapidly cut away one or the other member so that a sealing is no longer effected.

The present invention has as its object a construction in which these difficulties will be avoided.

Another object of the invention is the provision in an oil well pump of a valve construction so arranged that a sealing valve will gently move into sealing position and thus the injury resulting from the pounding of the liquid weight above is avoided.

Another object of the invention is the provision of a valve construction whereby a plurality of valve members will engage a common valve seat in such a manner that either of the valve members will serve to effect a closing of the valve. Consequently, should one of the valves be spaced apart by sand or foreign material, the other valve will function to effect the closing and a sand cutting operation is avoided.

Another object of the invention is the provision in an oil well pump of a valve mechanism having a plurality of concentrically arranged valves, each adapted for engagement with a common valve seat and each movable independently of the other.

Other objects will appear hereinafter.

It is recognized that various modifications and changes may be made in the detail of structure illustrated without departing from the invention and it is intended that such variations shall be encompassed within the scope of the claims which form a part hereof.

Forming a part of this specification are drawings in which.

Figures 1, 2, 3:
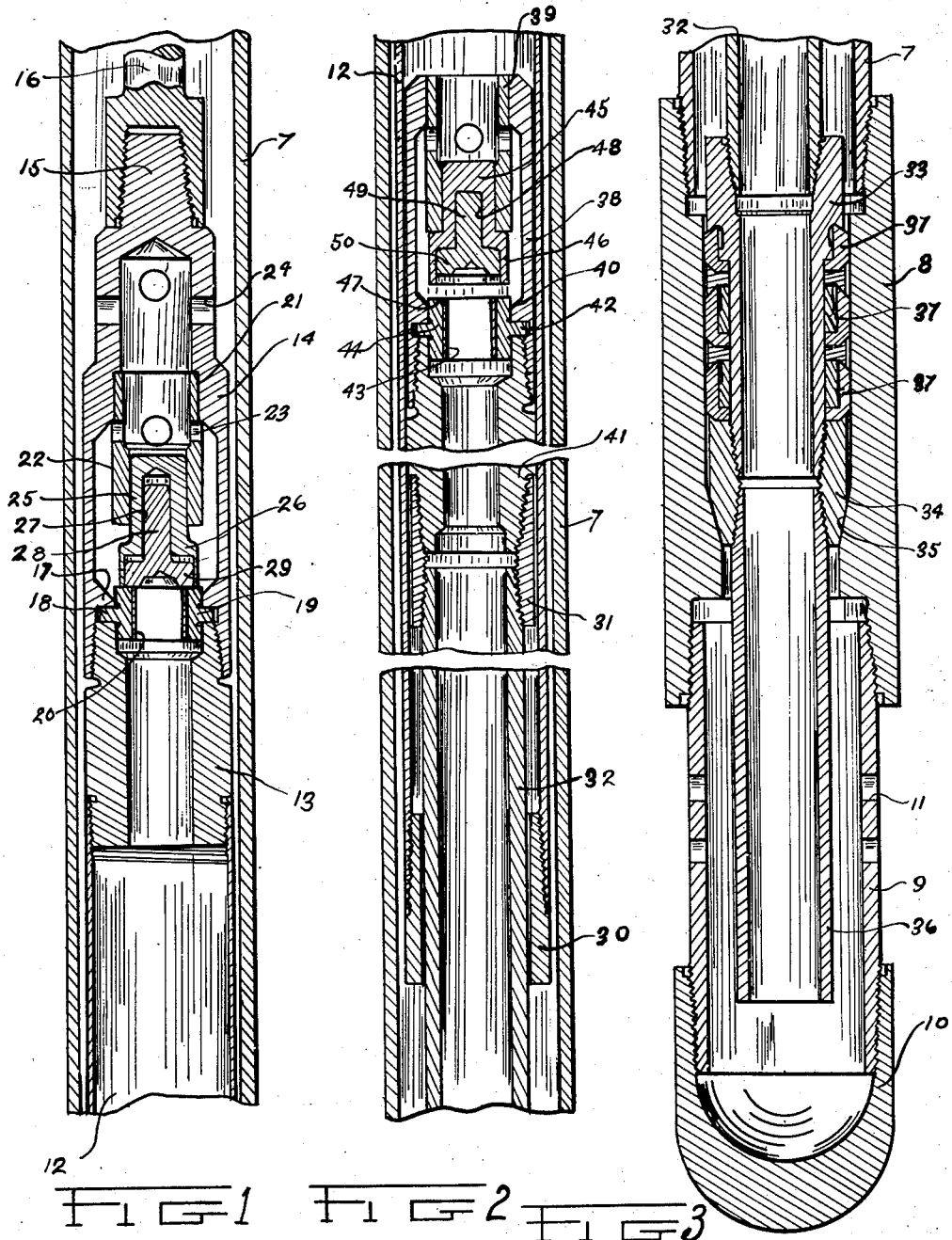
Fig. 1 is a longitudinal, central, sectional view of a pump structure showing the invention applied.
Fig. 2 is a longitudinal, central, sectional view of the structure taken below the section shown in Fig. 1.
Fig. 3 is a longitudinal, central, sectional view of a section of the structure taken at a position below that shown in Fig. 2.

In the drawings, I have illustrated the invention used with an oil well having a tube 7 which extends downwardly and is connected to the anchor shoe 8. Fastened to and extending below the anchor shoe is the separator tube 9 which is closed at its lower end by the bull plug 10. A plurality of lateral openings 11 are formed in the gas separator tube 9. Slidably positioned in the tubing 7 is the travelling barrel or work barrel 12, the upper end of which is connected to the valve coupling 13 which is connected at its upper end to the valve cage 14 having the threaded stud 15 at its upper end which connects to the sucker rod 16. The valve cage 14 is provided with the inwardly directed flange 17 against which is clamped, by the coupling 13, the peripheral flange 18 on the valve seat 19. Pressed into the bore formed in the valve seat 19 is a bushing 20.

Pressed into the bore 21 of the valve cage 14 is a guide sleeve 22 having a plurality of openings 23 formed therein. The upper portion of the valve cage is also provided with a plurality of openings 24 and it will be noted that the valve cage 14, the barrel 12 and the parts connecting these two members are slightly spaced at their periphery from the inner space of the tubing 7. Extended into the sleeve 22 so as to freely slide therein is a cup 25 having an enlarged cup-shaped structure 26 on one end. The end edges of the cup 26 are adapted to engage the end face of the valve seat 19 and effect a sealing connection. Slidably projected into the bore 27 of the cup-shaped structure 25 is a stem 28 which projects centrally outwardly from the cup-shaped member 29 which nests in the cup 26 and which is adapted to engage at its end faces with the face of the valve seat 19. The stem 28 is a loose fit in the bore 27, there being considerable clearance between these parts, reaching perhaps a clearance of thirty-thousandths of an inch.

The lower end of the barrel 12 is provided with the pull nut 30 which projects inwardly from the inner surface of the barrel 12 and serves as an abutment member for engaging the pull tube plunger coupling 31 when it is desired to pull the standing valve of the well. This standing valve, in the structure shown in the drawings, is embraced by the barrel 12 and the construction of the same will now be described.

A pull tube 32 is connected at its upper end to the coupling 31 and at its lower end to the anchor or cup hold down member 33. Threaded onto the lower end of the member 33 is a seating collar 34 which is adapted to seat against the surface 35 in the anchor shoe 8. Secured to and projecting downwardly from the seating collar so as to extend within the gas tube 9 is the production tube 36. Suitable sealing gaskets 37 are mounted on the member 33 so as to seal against the inner surface of the anchor shoe 8. Connected to the upper end of the coupling 31 is a center or standing valve cage 38 pressed into which is a guide sleeve 39. A shoulder 40 is formed on the cage 38 and clamped against this shoulder 40 by means of the standing plunger 41 is the peripheral flange 42 of the valve seat 44 having a bore formed therethrough lined by the bushing 43. Slidably engaging in the sleeve 39 is a hollow stem 45 which terminates in the cup-shaped member 46 adapted to engage at its end edges with the face 47 of the valve seat 44. A bore 48 is formed in the stem 45 and loosely engaging in this bore 48 is the stem 49 carrying at its lower end the cup-shaped structure 50 which is adapted to engage at its end edges or faces with the face 47 of the valve seat 44. The standing valve construction positioned below the travelling valve is of substantially the same construction as the travelling valve. The function and operation is quite similar also. When the pump is being operated, the sucker rod 16 is, of course, being reciprocated by a suitable source of power. As the rod 16 moves upwardly, the barrel 12 and the mechanism between the barrel 12 and the rod 16 also moves as a unit. The valve members 26 and 29 will, on this upward movement, be in engagement with the face of the valve seat 19 and effect the necessary sealing or closing of the valve, the cup-shaped valves 46 and 50 will be moved upwardly into open position, as shown in Fig. 2.

It will be noted that the valves 46 and 50 are closely nested. On the reverse stroke, these valves 50 and 46 will move into closing position, the valve member 50 moving into the same relative position to the valve member 46 as the valve member 29 bears to the valve member 26 in Fig. 1. At the same time, that is on the reverse stroke, the valve member 29 will move further inwardly of the valve member 26 so as to fully nest therein.

As the downward stroke begins, a suction will be set up on the valves 46 and 50, tending to pull these valves downwardly into closed position. Since the suction will be centered more directly on the valve 50 than on the valve 46, the valve 50 will close first followed, after a brief interval, by a closing of the valve 46. The valve 50, however, in closing is not closing in response to the pressure of the column of liquid above, as the column of liquid above cannot reach it to exert downward pressure on it but rather serves to retard its movement into closing position. Consequently, the valve closes with a slow, easy movement and there is no pounding against the valve seat. The liquid above, in the meantime, is filling the space in the bore 48 so that the downward movement of the valve 46 does not begin until after the valve 50 has closed. The pressure of the liquid around the valve 46 gradually is equalized and this valve moves downwardly but, in doing so, the liquid in the bore 48 has to be pressed outwardly, thus retarding the movement of the valve 46 to closing position. In practical operation, the valve 50 when it seats on its seat 44 does not make an absolutely leak-proof connection as there will always be some foreign material between the meeting faces. Consequently, there will always be a slight amount of leakage and this leakage permits the valve 46 to close as otherwise the equalized pressure would unduly retard the closing of the valve.

The same action takes place on the valves 26 and 29. Examining Fig. 1, it is obvious that when the sucker rod 16 is moving on its upward stroke, the valves 26 and 29 will be in the position shown in Fig. 1. However, as the sucker rod completes its upward stroke and begins its downward stroke, the portion 25 will slide upwardly in the sleeve 22 and the valve 29 will slide upwardly in the valve 26. On the reverse movement, the valve 29 will close in the manner described for the valve 50. Likewise, the valve 26 will close shortly after the valve 29 but this closing will be slow and easy and there will be no pounding.

When the valves move from the position shown in Fig. 1 to open position, as shown in Fig. 2, there is an action which takes place and which it is believed should be referred to. For instance, when the valve 50 has moved into the position shown in Fig. 2, it has not moved into nesting with the cup 46 rapidly so as to deliver a blow but slowly so that the liquid in the bore 48 is led outwardly. This, however, does not prevent a rapid opening of the valves. As soon as the upward stroke on the sucker rod 16 commences, the valve 46 will move upwardly and rapidly open the passage through the valve seat 44. After the valve 46 has reached the position shown in Fig. 2, the valve 50 will continue its upward movement in response to the pressure of the liquid rushing up from below until it has fully nested in the valve 46, as shown in Fig. 2. The same, of course, applies to the operation and function of the valves 26 and 29.

It will be noted that the valves engage the common valve seat and that these valves are concentric of each other so that should one of the valves be held unduly spaced from its seat, the cutting of the sand upon it by the liquid would be prevented because the other valve would be able to effect the sealing and prevent the rapid flow of liquid which is necessary to carry on the sand cutting action.

It is preferred that the valve seats 19 and 44 be made from non-magnetic material. These seats may be made out of Dow metal, Monel metal, various types of stainless steel or any other non-magnetic alloy or metal. When forming the seats 19 or 44 from a comparatively soft, non-magnetic material, it is preferred that the bushings 20 and 43 be made from a hard, wear-resisting material, such as tool steel or a wear-resisting copper alloy of a high degree of hardness.

Should a particle of sand lodge under the valve 29 so as to tilt it at one side, the valve 26 must move to closed position so that the clearance between the valve 29 and the valve 26 must be sufficient to permit this relative tilt. Likewise, the clearance between the stem 28 and the bore or socket 27 must be sufficient to permit this tilt. The clearance between the valve 29 and the valve 26 will be between 20,000ths and 50,000ths of an inch and the clearance between the stem 28 and the bore or passage 27 would be slightly greater than this and the clearance between the neck 25 and the tube 21 would be even more.

In this manner, I have provided a pump structure, and particularly a valve structure, attaining the objects set out and avoiding the difficulties referred to. This results, of course, in a more highly efficient pump as it effects a greater volume and reduces to a minimum the number of times it is necessary to pull the pumps to remove and replace the valve and valve seats.

What I claim as new is:

1. In a pumping mechanism: a valve seat positioned in the path of flow of liquid and having an opening formed therethrough for passage of liquid therethrough and provided with an end face for engaging a valve for closing said opening said end face lying in a plane at right angles to its axis; a guide sleeve having a bore formed therethrough arranged in axial alignment with said valve seat; a cup-shaped valve for engaging the face of said valve seat for closing the passage therethrough and provided with a hollow neck extending into said guide sleeve and slidable therein; a second cup-shaped valve engageable with said seat face simultaneously with the engagement of said first valve with said seat face and nesting in said first-named cup-shaped valve; a stem projecting centrally from the base of said second valve and slidably engaging in said neck; and a valve cage embracing said valve structure for conducting fluid passing through said opening along and around said valve structure, said fluid having access to the hollow portion of said neck, said stem being of sufficiently small diameter to provide space in said neck for passage of fluid thereinto and therefrom.

2. In a pumping mechanism: a valve seat positioned in the path of flowing liquid and having an opening formed therethrough for passage of liquid therethrough and provided with an end face for engaging a valve for closing said opening; a guide sleeve having a bore formed therethrough arranged in axial alignment with said valve seat; a cup-shaped valve for engaging the face of said valve seat for closing the passage therethrough and provided with a hollow neck projecting outwardly from its base and extending into said guide sleeve and slidable therein; a second cup-shaped valve nesting in said first named cup-shaped valve and engageable with said seat face simultaneously with the engagement with said first named valve with said seat face; a stem projecting centrally from the base of said second valve and slidably engaging in said neck; and a valve cage embracing said valve structure for conducting fluid passing therethrough along and around said valve structure, said fluid having access to the hollow portion of said neck, the portion of said cup-shaped valve nesting in said first named valve and being of less diameter than the portion in which nested and said stem of sufficiently smaller diameter than the interior diameter of said neck to provide space in said neck for passage of fluid thereinto and therefrom, said stem being of less length than the interior of said neck.

CHALON E. BRIDWELL.

REFERENCES CITED

The following references are of record in the file of this patent:

UNITED STATES PATENTS

| Number | Name | Date |
|---|---|---|
| 349,586 | Glace | Sept. 21, 1886 |
| 1,199,569 | Kelsey | Sept. 26, 1916 |
| 1,572,507 | Robert | Feb. 9, 1926 |
| 1,786,846 | Hodsdon | Dec. 30, 1930 |
| 2,339,101 | Parker | Jan. 11, 1944 |